United States Patent
Choi et al.

(10) Patent No.: US 12,267,191 B2
(45) Date of Patent: Apr. 1, 2025

(54) APPARATUS AND METHOD FOR CORRECTING COMMUNICATION FREQUENCY OF ELECTRONIC DETONATOR

(71) Applicant: HANWHA CORPORATION, Seoul (KR)

(72) Inventors: Jeong Ho Choi, Cheongju-si (KR); Se Ho Kim, Cheongju-si (KP)

(73) Assignee: HANWHA CORPORATION, Seoul (KR)

( * ) Notice: Subject to any disclaimer, the term of this patent is extended or adjusted under 35 U.S.C. 154(b) by 0 days.

(21) Appl. No.: 18/279,100

(22) PCT Filed: Jul. 7, 2023

(86) PCT No.: PCT/KR2023/009647
§ 371 (c)(1),
(2) Date: Aug. 28, 2023

(87) PCT Pub. No.: WO2024/128445
PCT Pub. Date: Jun. 20, 2024

(65) Prior Publication Data
US 2025/0030582 A1    Jan. 23, 2025

(30) Foreign Application Priority Data
Dec. 16, 2022 (KR) .................. 10-2022-0177010

(51) Int. Cl.
*F42C 11/06* (2006.01)
*H04L 27/00* (2006.01)

(52) U.S. Cl.
CPC .......... *H04L 27/0014* (2013.01); *F42C 11/06* (2013.01); *H04L 2027/0016* (2013.01)

(58) Field of Classification Search
CPC ......... H04L 27/0014; H04L 2027/0016; F42C 11/06
See application file for complete search history.

(56) References Cited

U.S. PATENT DOCUMENTS

| | | | |
|---|---|---|---|
| 6,378,435 B1 * | 4/2002 | Bai | F42C 11/06 102/397 |
| 11,105,600 B1 * | 8/2021 | Berner | H04L 12/4135 |
| 2003/0101889 A1 | 6/2003 | Hallin et al. | |
| 2006/0130693 A1 * | 6/2006 | Teowee | F42B 3/122 102/215 |

FOREIGN PATENT DOCUMENTS

KR   10-2022-0067914 A    8/2002

* cited by examiner

*Primary Examiner* — Janice N Tieu
(74) *Attorney, Agent, or Firm* — WHDA, LLP

(57) ABSTRACT

Proposed are an apparatus and a method for correcting a communication frequency of an electronic detonator, and the apparatus includes a communication packet reception part configured to receive communication packets generated at a preset frequency transmitted from a main control device, an oscillation frequency determination part configured to determine an oscillation frequency of an oscillator mounted in an MCU of an electronic detonator by referring to received communication packets, and an oscillation frequency correction part configured to analyze the communication packets by correcting a shift of a determined oscillation frequency.

8 Claims, 3 Drawing Sheets

# APPARATUS AND METHOD FOR CORRECTING COMMUNICATION FREQUENCY OF ELECTRONIC DETONATOR

TECHNICAL FIELD

The present disclosure relates, in general, to an apparatus and a method for correcting a communication frequency of an electronic detonator and, more particularly, to an apparatus and a method for correcting a communication frequency of an electronic detonator, in which communication packets generated at a preset frequency transmitted from a main control device are received, an oscillation frequency of an oscillator mounted in the MCU of the electronic detonator is determined by referring to the received communication packets, and a shift of the determined oscillation frequency is corrected to analyze the communication packets.

BACKGROUND ART

Blasting techniques are steadily evolving on the basis of experience and development over a long period of time. An electronic detonator stores electrical energy supplied from a main control device in an energy storage circuit, and performs a switching operation to supply the energy stored in the energy storage circuit to the detonator after a predetermined delay time has elapsed. With the introduction of the technology of the rapidly developing electronics industry, an electronic detonator that can adjust the delay time of the detonator with an integrated circuit has been developed and utilization thereof is increasing.

A conventional detonator has a delay element mounted therein to set the burning time of the element as a delay time, and is significantly lower in delay time precision than an electronic detonator. In addition, since the delay time is determined during manufacturing the conventional detonator, it is impossible to change the delay time during use of the detonator.

In contrast, in an electronic detonator, a high-density integrated circuit is used to increase the delay time precision, and two-wire communication with a main control device (a charger) is used to set and change the delay time arbitrarily, and it is also possible to check the status of an installed detonator and change the delay time at a site.

A microcontroller unit (MCU) of a normal electronic detonator is driven by attaching a clock source to the outside thereof, but the electronic detonator cannot use a price competitive oscillator due to problems such as a high unit price, limited space, and low shock resistance. Accordingly, an oscillator mounted inside the microcontroller unit is required to be used, but frequency variation is large according to the temperature of the oscillator, so the difference between the temperature of the oscillator and a room temperature is large, thus it is difficult to perform normal communication.

In this regard, Korean Patent Publication No. 10-1996-0702097 discloses an "ELECTRONIC DELAY DETONATOR".

DISCLOSURE

Technical Problem

The present disclosure has been made to solve the above problems, and is intended to propose an apparatus and a method for correcting a communication frequency of an electronic detonator, in which communication packets generated at a preset frequency transmitted from a main control device are received, an oscillation frequency of an oscillator mounted in the MCU of the electronic detonator is determined by referring to the received communication packets, and a shift of the determined oscillation frequency is corrected to analyze the communication packets.

Technical Solution

In order to achieve the above objectives, an apparatus for correcting communication frequency of an electronic detonator according to the present disclosure includes: a communication packet reception part configured to receive communication packets generated at a preset frequency transmitted from a main control device; an oscillation frequency determination part configured to determine an oscillation frequency of an oscillator mounted in an electronic detonator by referring to received communication packets; and an oscillation frequency correction part configured to analyze the communication packets by correcting a shift of a determined oscillation frequency.

In addition, the oscillation frequency determination part may count a bit period and a pulse width of several bits among the received communication packets as a pulse of the oscillator.

Furthermore, the oscillation frequency determination part may measure a duty of a bit before determining the oscillation frequency and may preset a specific point within a measured bit period as a determination criterion when the oscillation frequency is determined.

Additionally, when the oscillation frequency is determined, the oscillation frequency determination part may measure a duty period of each bit during a period of the reception of the communication packets to determine the bit period, and may compare a duty of each bit stored with the preset determination criterion to determine the bit.

In order to achieve the above objectives, a method for correcting communication frequency of an electronic detonator according to the present disclosure includes: receiving, by a communication packet reception part, communication packets generated at a preset frequency transmitted from a main control device; determining, by an oscillation frequency determination part, an oscillation frequency of an oscillator mounted in an MCU of an electronic detonator by referring to received communication packets; and analyzing, by an oscillation frequency correction part, the communication packets by correcting a shift of a determined oscillation frequency.

In addition, in the determining of the oscillation frequency of the oscillator mounted in the MCU of the electronic detonator by referring to the received communication packets, a bit period and a pulse width of several bits among the received communication packets may be counted as a pulse of the oscillator.

Furthermore, in the determining of the oscillation frequency of the oscillator mounted in the MCU of the electronic detonator by referring to the received communication packets, before the oscillation frequency is determined, a duty of a bit may be measured, and when the oscillation frequency is determined, a specific point within a measured bit period may be preset as a determination criterion.

Additionally, in the determining of the oscillation frequency of the oscillator mounted in the MCU of the electronic detonator by referring to the received communication packets, when the oscillation frequency is determined, a duty period of each bit during a period of the reception of the communication packets may be measured to determine the bit period, and then a duty of each bit stored may be compared with the preset determination criterion to determine the bit.

Advantageous Effects

To achieve the objectives described above, according to the apparatus and method for correcting communication frequency of an electronic detonator according to the present disclosure, communication packets generated at a preset frequency transmitted from a main control device are received, an oscillation frequency of an oscillator mounted in the MCU of the electronic detonator is determined by referring to the received communication packets, and a shift of the determined oscillation frequency is corrected to analyze the communication packets, thereby improving communication performance by repeating a corresponding correction sequence for every communication even in an environment in which the oscillation frequency changes rapidly, that is, in an environment with severe temperature changes.

DESCRIPTION OF THE REFERENCE NUMERALS IN THE DRAWINGS

Figure 1:
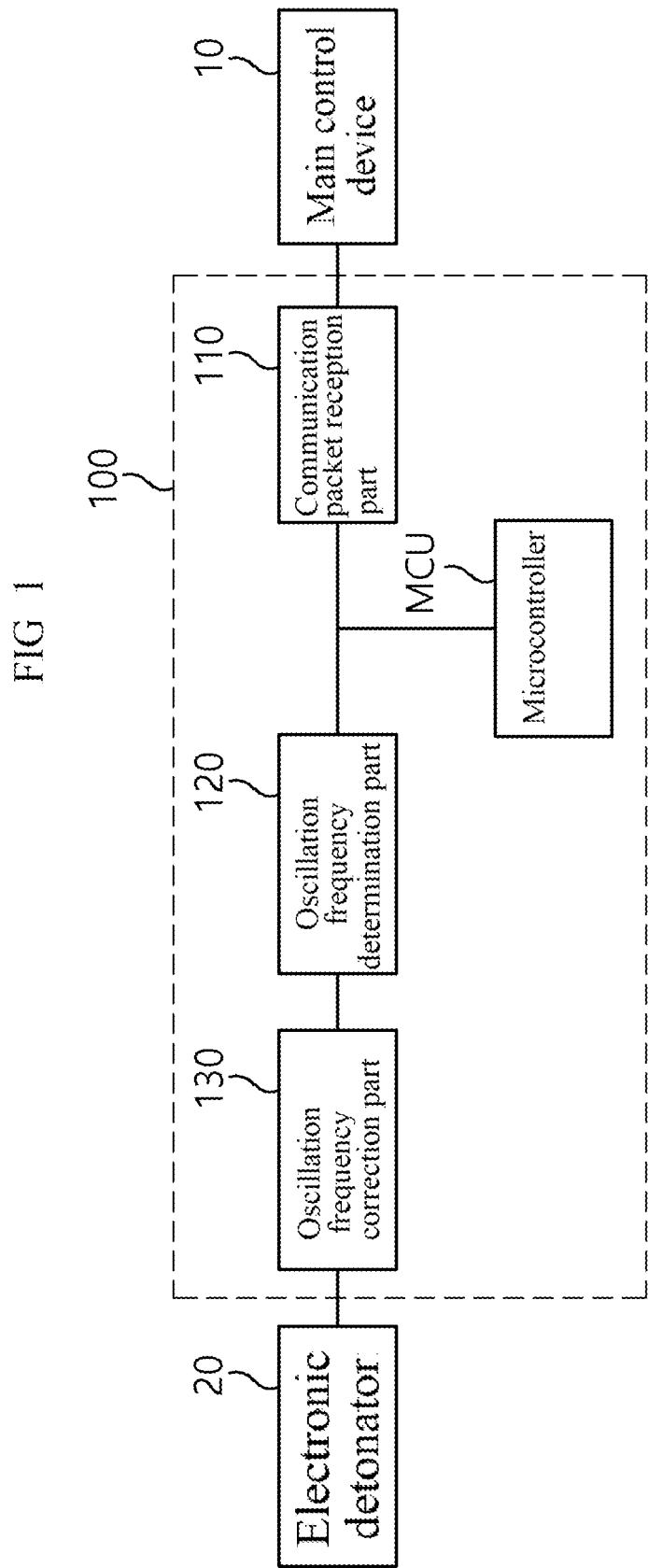
FIG. 1 is a view illustrating configuration of an apparatus for correcting a communication frequency of an electronic detonator according to the present disclosure.

100: Apparatus for correcting a communication frequency of an electronic detonator
110: Communication packet reception part
120: Oscillation frequency determination part
130: Oscillation frequency correction part

BEST MODE

The present disclosure may be subject to various changes and may have multiple embodiments, and specific embodiments are illustrated in the drawings and described in detail.

However, this is not intended to limit the present disclosure to the specific embodiments, and should be understood to include all changes, equivalents, or substitutes included in the spirit and technical scope of the present disclosure. Like reference numbers have been used for like elements throughout the description of each of the drawings.

It should be understood that when an element is referred to as being "coupled" or "connected" to another element, it may be directly coupled or connected to the other element of intervening elements may be present therebetween. In contrast, it should be understood that when an element is referred to as being "directly coupled" or "directly connected" to another element, there are no intervening elements present therebetween.

Terms used in this specification are only used to describe specific embodiments, and are not intended to limit the present disclosure. Singular expressions include plural expressions unless the context clearly dictates otherwise. It should be understood that terms such as "include", and "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, with reference to the accompanying drawings, exemplary embodiments of the present disclosure will be described in more detail. Hereinafter, the same reference numerals are used for the same components in the drawings, and redundant descriptions of the same components are omitted.

Figure 2:
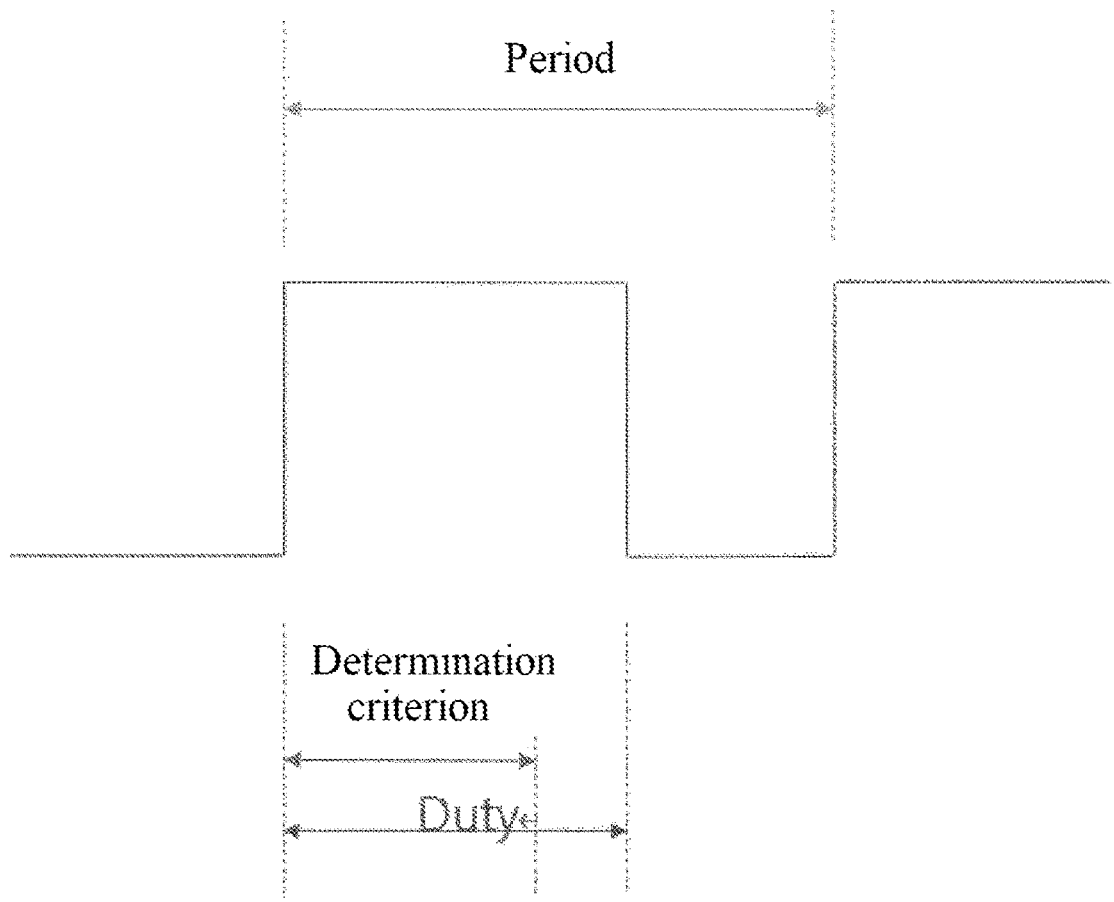
FIG. 2 is a view illustrating an embodiment of the apparatus for correcting a communication frequency of an electronic detonator according to the present disclosure.

FIG. 1 is a view illustrating configuration of an apparatus for correcting a communication frequency of an electronic detonator according to the present disclosure, and FIG. 2 is a view illustrating an embodiment of the apparatus for correcting a communication frequency of an electronic detonator according to the present disclosure.

Referring to FIGS. 1 and 2, the apparatus 100 for correcting a communication frequency of an electronic detonator according to the present disclosure may largely include a communication packet reception part 110, an oscillation frequency determination part 120, and an oscillation frequency correction part 130.

The communication packet reception part 110 receives communication packets generated at a preset frequency transmitted from the main control device.

Here, the main control device transmits detonator blasting delay time presetting and a blasting command to a microcontroller unit (hereinafter, referred to as MCU) which controls the blasting of a detonator. The main control device generates a precise clock at the start of communication and transmits a data frame having preamble, command, address, and data information to the MCU by using the oscillating clock as a source. The MCU receives a time standard pulse of a predetermined length including a start pulse, a pulse having an arbitrary length, and a stop pulse in the form of a preamble from the main control device. In this case, the MCU of each electronic detonator is connected in parallel with the main control device, receives a data frame including a preamble, and operates independently.

The oscillation frequency determination part 120 determines an oscillation frequency of the oscillator mounted in the MCU of the electronic detonator by referring to received communication packets.

The oscillation frequency determination part 120 counts the bit period and pulse width of several bits among the received communication packets as a pulse of the oscillator.

In addition, the oscillation frequency determination part 120 measures the duty of a bit before determining the oscillation frequency and presets a specific point within a measured bit period as a determination criterion when the oscillation frequency is determined.

When the oscillation frequency is determined, the oscillation frequency determination part 120 measures the duty period of each bit ding a period of the reception of the communication packets to determine the bit period, and then compares duty of each bit stored with the preset determination criterion to determine the bit.

The oscillation frequency correction part 130 analyzes the communication packets by correcting a shift of the determined oscillation frequency.

That is, according to the present disclosure, as illustrated in FIG. 2, assuming that a predefined period is 2 ms (i.e., the period of a signal bit sent from the main control device is 2 ms), the oscillation target frequency of an oscillator mounted in the IC of the electronic detonator is 100 kHz, the average value of the period count of each bit is 400 counts, a duty coefficient is 300, and the determination criterion is 1 ms from the start of communication, the oscillation frequency of the corresponding oscillator is 200 kHz, a duty is measured as length of 1.5 ms, and the corresponding bit is determined as 1 compared to the determination criterion.

Figure 3:
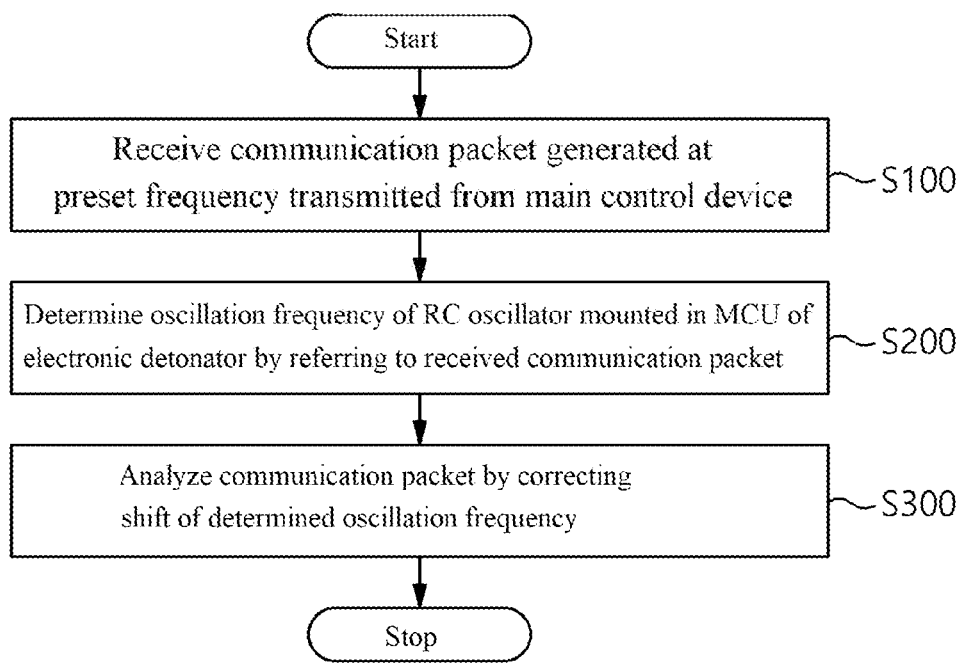
FIG. 3 is a flowchart illustrating the order of a method for correcting a communication frequency of an electronic detonator according to the present disclosure.

FIG. 3 is a flowchart illustrating the order of a method for correcting a communication frequency of an electronic detonator according to the present disclosure.

Referring to FIG. 3, the method for correcting a communication frequency of an electronic detonator according to the present disclosure uses the apparatus for correcting a communication frequency of an electronic detonator according to the present disclosure described above, and redundant descriptions will be omitted below.

First, communication packets generated at a preset frequency transmitted from the main control device are received at S100.

At S100, the main control device transmits the detonator blasting delay time presetting and the blasting command to the microcontroller unit (hereinafter, referred to as MCU) which controls the blasting of a detonator. The main control device generates a precise clock at the start of communication and transmits a data frame having preamble, command, address, and data information to the MCU by using the oscillating clock as a source.

Next, the oscillation frequency of the oscillator mounted in the MCU of the electronic detonator is determined by referring to received communication packets at S200.

At S200, the bit period and pulse width of several bits among the received communication packets are counted as a pulse of the oscillator.

In addition, before the oscillation frequency is determined, duty of a bit is measured, and when the oscillation frequency is determined, a specific point within a measured bit period is preset as the determination criterion. In addition, when the oscillation frequency is determined, the duty period of each bit during the period of the reception of the communication packets is measured to determine the bit period, and then the duty of each bit stored is compared with the preset determination criterion to determine the bit.

Next, the communication packets are analyzed by correcting a shift of the determined oscillation frequency at S300.

The functional operations described in this specification and the embodiments related to the present subject matter can be implemented in digital electronic circuits, computer software, firmware, or hardware, or in a combination of at least two thereof, including the structures disclosed in this specification and their structural equivalents.

The embodiments of the subject matter described in the present specification may be implemented as at least one module for one or more computer program commands encoded on a tangible program medium for execution by one or more computer program products, that is, a data processing device or for controlling the operation. The tangible program medium may be a radio signal or computer readable medium. The radio signal is an artificially generated signal such as a machine-generated electrical, optical or electromagnetic signal, which is generated for encoding information to be transmitted to a suitable receiver device for execution by a computer. The computer readable medium may be a machine readable storage device, a machine readable storage substrate, a memory device, a combination of materials that affect a machine readable radio signal, or a combination of at least two thereof.

A computer program (also known as a program, software, software application, script, or code) may be written in any form of programming language, including compiled or interpreted language or a priori or procedural language, and may be deployed in any form including stand-alone programs or modules, components, subroutines, or other units suitable to be used in a computer environment.

A computer program does not necessarily correspond to a file on a file device. A program may be stored in a single file provided to a requested program, in multiple interacting files (e.g., a file which stores one or more modules, a subprogram, or a portion of a code), or in a portion of a file holding other programs or data (e.g., one or more scripts stored in a markup language document).

A computer program may be located at one site or may be distributed across a plurality of sites and may be deployed to run on multiple computers interconnected by a communication network or on one computer.

Additionally, a logic flow and structural block diagrams described in this patent document describe corresponding actions and/or specific methods supported by corresponding functions and steps supported by the disclosed structural means and can be used to establish corresponding software structures and algorithms and equivalents thereof.

Processes and logic flows described in the present specification can be performed by one or more programmable processors executing one or more computer programs to perform functions by operating on received data and generating outputs.

A processor suitable for the execution of computer programs includes, for example, both general and special purpose microprocessors and any one or more processors of any type of digital computer. Generally, a processor receives commands and data from either read-only memory or random access memory or both of them.

The core elements of a computer are one or more memory devices for storing commands and data and a processor for executing the commands. In addition, a computer may be generally operably coupled to one or more mass storage devices for receiving data from the mass storage devices for storing data, such as magneto-optical disks or optical disks, or transferring data thereto or performing both of such operations or may include the mass storage devices. However, a computer is not required to have such a device.

The present description presents the best mode of the present disclosure, and provides examples to describe the present disclosure and to enable those skilled in the art to manufacture and use the apparatus of the present disclosure. The specification prepared in this way does not limit the present disclosure to specific terms presented.

Accordingly, although the present disclosure has been described in detail with reference to the above-described examples, those skilled in the art may make modifications, and changes, and variations of the present examples without departing from the scope of the present disclosure. In short, in order to achieve the intended effects of the present disclosure, it is not necessary to separately include all function blocks shown in the drawings or to follow all the order shown in the drawings in the same order shown. It should be noted that even if not, the present disclosure may fall within the technical scope of the claims.

The invention claimed is:

1. An apparatus for correcting a communication frequency of an electronic detonator, the apparatus comprising:
a communication packet reception part configured to receive communication packets generated at a preset frequency transmitted from a main control device;

an oscillation frequency determination part configured to determine an oscillation frequency of an oscillator mounted in an microcontroller unit (MCU) of the electronic detonator by referring to the received communication packets; and
an oscillation frequency correction part configured to analyze the communication packets by correcting a shift of the determined oscillation frequency.

2. The apparatus of claim 1, wherein the oscillation frequency determination part counts a bit period and a pulse width of several bits among the received communication packets as a pulse of the oscillator.

3. The apparatus of claim 1, wherein the oscillation frequency determination part measures a duty of a bit before determining the oscillation frequency and presets a specific point within a measured bit period as a determination criterion when the oscillation frequency is determined.

4. The apparatus of claim 3, wherein when the oscillation frequency is determined, the oscillation frequency determination part measures a duty period of each bit during a period of the reception of the communication packets to determine the bit period, and compares a duty of each bit stored is with the preset determination criterion to determine the bit.

5. A method for correcting a communication frequency of an electronic detonator, the method comprising:
   receiving, by a communication packet reception part, communication packets generated at a preset frequency transmitted from a main control device;
   determining, by an oscillation frequency determination part, an oscillation frequency of an oscillator mounted in an microcontroller unit (MCU) of the electronic detonator by referring to the received communication packets; and
   analyzing, by an oscillation frequency correction part, the communication packets by correcting a shift of the determined oscillation frequency.

6. The method of claim 5, wherein in the determining of the oscillation frequency of the oscillator mounted in the MCU of the electronic detonator by referring to the received communication packets, a bit period and a pulse width of several bits among the received communication packets are counted as a pulse of the oscillator.

7. The method of claim 5, wherein in the determining of the oscillation frequency of the oscillator mounted in the MCU of the electronic detonator by referring to the received communication packets, before the oscillation frequency is determined, a duty of a bit is measured, and when the oscillation frequency is determined, a specific point within a measured bit period is preset as a determination criterion.

8. The method of claim 7, wherein in the determining of the oscillation frequency of the oscillator mounted in the MCU of the electronic detonator by referring to the received communication packets, when the oscillation frequency is determined, a duty period of each bit during a period of the reception of the communication packets is measured to determine the bit period, and then a duty of each bit stored is compared with the preset determination criterion to determine the bit.

* * * * *